10/6/87 OR 4,697,890

United States Patent [19]

Crookston, deceased

[11] Patent Number: 4,697,890

[45] Date of Patent: Oct. 6, 1987

[54] LIGHT EMITTING DEVICE

[76] Inventors: Byron F. Crookston, deceased, late of Provo, Utah; by Jena Vee S. Crookston, administrator, 1207 North, 1650 West, Provo, Utah 84604

[21] Appl. No.: 783,773

[22] Filed: Oct. 3, 1985

[51] Int. Cl.[4] .......... G02B 26/02; F16D 3/00

[52] U.S. Cl. .......... 350/407; 285/282; 403/164

[58] Field of Search .......... 350/320, 316, 407; 351/49; 403/164; 285/282; 16/20; 40/495

[56] References Cited

U.S. PATENT DOCUMENTS

| | | | |
|---|---|---|---|
| 744,545 | 11/1903 | Hervey | 40/495 |
| 1,750,986 | 3/1930 | Barry | 40/495 |
| 2,111,187 | 3/1938 | Keeler | 362/19 |
| 2,684,259 | 7/1954 | Schwartz | 285/282 |
| 3,423,149 | 1/1969 | Braunhut | 351/49 |
| 4,202,601 | 5/1980 | Burbo et al. | 350/407 |

FOREIGN PATENT DOCUMENTS

| | | | |
|---|---|---|---|
| 3208617 | 9/1983 | Fed. Rep. of Germany | 362/19 |
| 753494 | 10/1933 | France | 40/495 |
| 114602 | 1/1942 | United Kingdom | 403/164 |

*Primary Examiner*—William H. Punter

*Attorney, Agent, or Firm*—Thorpe, North & Western

[57] ABSTRACT

A device, such as a flashlight, spotlight, or reading light, for emitting an incident beam of light wherein the intensity and color of an incident beam of light emitted from the device can be manually modulated or adjusted. The device utilizes a variable density filter system which is manually adjustable and which incorporates a pair of optical linear polarizing filters or lenses which are mounted so that the emitted beam of light must pass through the polarizing filters. The filter system is adapted to produce at one extreme a high transmittance value when the axes of the polarizing filters are parallel. At the opposite extreme a very high extinction density is achieved when the axes of the polarizing filters are oriented so as to be essentially normal or perpendicular with each other. Varying optical densities are produced at settings between these two extremes.

3 Claims, 5 Drawing Figures

LIGHT EMITTING DEVICE

BACKGROUND OF THE INVENTION

1. Field

The present invention in general pertains to light emitting apparatus such as flashlights, spotlights, reading lights, etc. of the type having means for light modulation which varies the color and intensity or brightness of an incident beam of light produced by the apparatus. In particular, the present invention pertains to a novel inexpensive means for light modulation by varying the optical density and color emitted by the light emitting apparatus using a variable density filter system which is manually operated and which incorporates a pair of synthetic linear polarizing filters (polarizers) that produce an incident polarized beam of light where extreme or very high extinction density is required.

2. State of the Art

In many situations it would be highly advantageous to have a device for emitting an incident beam of light, such as a reading light, flashlight, or spotlight which could be quickly and easily adjusted by simple manual manipulation of a dial, knob, lens etc., so as to control the intensity or brightness of the incident beam of light produced by the device over a broad range from maximum intensity to a very subdued intensity approaching almost total extinction. Military flashlights are often supplied with a set of lenses including a clear lens, an opaque lens and one or more colored lenses. The lens cap of the flashlight must be removed and the lenses changed when a different color or change in opacity is desired opacity. This is a tedious, time consuming operation, and the various lenses of the set of lenses are easily misplaced and lost. Relatively costly circuitry can be incorporated into the flashlight or spotlight to effectively control the intensity of the incident beam of light produced by the flashlight by varying the voltage applied to the lamp. Such circuitry is prone to wear and premature failure in addition to being costly.

Polarized filters, hereinafter referred to as lenses, have been used to filter light. In U.S. Pat. Nos. 2,705,318 and 3,511,211 it is proposed to use polarized lenses in instrument panel dials in aircraft and automobiles to control the illumination of the gauges in the instrument panel. The light from the polarized lenses illuminates transparent indicia on a dial which is located in close proximity to the polarized lenses. There is no suggestion that the light passing through the polarized lenses could be projected as an incident beam of light to illuminate specific objects at a considerable distance from the polarized lenses. In U.S. Pat. No. 2,263,684 a safe light for use in handling photographic materials is disclosed in which polarized lenses are used to control the intensity of emitted light. The light in a photographic darkroom must be greatly subdued and dispersed, and there again is no suggestion that the light passing through the polarized lenses could be projected as an incident beam of light to illuminate specific objects at a considerable distance.

OBJECTIVES

A principal objective of the present invention is to provide a device for emitting an incident beam of light, such as a reading light, a flashlight, or spotlight having a lens system which can be manually adjusted to vary the intensity of the beam of light emitted therefrom without requiring a change of lens elements or the removal of the lens cap or lens element from the reading lamp, flashlight, or spotlight. A particular objective of the present invention is to provide a flashlight, spotlight or reading lamp which utilizes polarized lenses which can be adjusted manually to vary the intensity of the beam of light emitted from the flashlight spotlight, or reading lamp. A specific objective of the invention is to provide a flashlight, especially of the military type, which utilizes polarized lenses to provide light discipline for the user of the flashlight to vary the intensity of light and to provide desired colors of light, whereby the light intensity can be controlled from a very dim condition to full brightness with a simple adjustment of the polarized lenses. An additional specific objective of the invention is to provide inexpensive polarized lens elements which can be used in existing military style flashlights to provide light discipline with the existing flashlights.

BRIEF DESCRIPTION OF THE INVENTION

The above objectives are achieved in accordance with one embodiment of the present invention by providing a novel improvement to a flashlight of the type comprising a conventional battery compartment, a lamp, and means for energizing the lamp from batteries contained in the battery compartment. The novel, unique improvement of the present invention comprises positioning a pair of polarized lenses in a lens cap adjacent to the lamp such that the light beam from the lamp is directed through the polarized lenses. The terms lens, lenses and lens elements as used throughout the specification and claims are meant to mean the protective generally transparent shields used to cover the end of a flashlight or spotlight and through which the light emitted by the light generating means passes. Generally, the lens or lens elements are disc shaped and are contained in a cap member which is adapted to retain the lens or lens elements in their proper position. The cap member is referred to throughout the specification and claims as a lens cap. The term polarized lenses is meant to mean lenses made from synthetic linear polarizing filters (polarizers).

The polarized lenses are mounted for relative rotation about a transverse axis, i.e., an axis substantially normal to the planes of the faces of the polarized lenses. One of the polarized lenses is mounted such that it can be rotated by at least 90 degrees and up to 180 degrees about the transverse axis. The second polarized lens may be mounted for rotational movement if desired, but provision of rotational movement for the second lens is not necessary. In a preferred embodiment of the invention, one of the lenses of the pair of polarized lenses is mounted so as to be substantially fixed while the other lens is adapted to be rotated. The rotational movement of one of the lenses of the pair of polarized lenses will effectively vary the intensity of the beam of light passing through the lenses from the maximum intensity produced by the lamp and reflector to any degree of decreased intensity desired up to an approaching almost total extinction. Thus, with the pair of self-contained, polarized lenses, the intensity of the beam of light from the flashlight can be instantaneously selected as desired without requiring disassembly of the flashlight or the addition or replacement of one lens with another. The polarized lenses are relatively inexpensive and are not subject to wear and malfunctioning as would be electronic circuitry which can be incorporated in the flashlight to vary the voltage applied to the lamp and thus the intensity of the light output of the lamp.

When used in military applications, the flashlight or polarized lens system of the present invention allows the user to exercise complete light discipline during night maneuvers or in other blackout conditions. When on night maneuvers, especially with no moonlight or other light source, ones eyes become very sensitive to light. If a light is required to read maps, compasses, instruments, etc. or to identify persons or objects, the eyes adjust to that light, and when that light is turned off, it takes several minutes for one's eyes to return to their state prior to when the light source was used. During this period one's vision is severely impaired, and it may take up to 45 minutes or longer for one's eyes to readjust to the dark conditions so as to provide maximum vision.

When using the light source including the polarized lens system of the present invention, the intensity of the light from the light source can be controlled to produce just sufficient light for the user to read maps, compasses, instructions, etc. without effecting a significant physiological change in eyes of the person. Thus, when the light is then extinguished, the eyes of the user require only minimal adjusted for night vision with little if any period of blackout while the eyes readjust.

Additional objects, features and advantages of the present invention will become apparent from the following detailed description, taken together with the accompanying drawing.

THE DRAWING

Preferred embodiments of the present invention representing the best mode presently contemplated of carrying out the invention are illustrated in the figure of the drawings in which.

DETAILED DESCRIPTION OF THE ILLUSTRATED EMBODIMENTS

Figure 1:
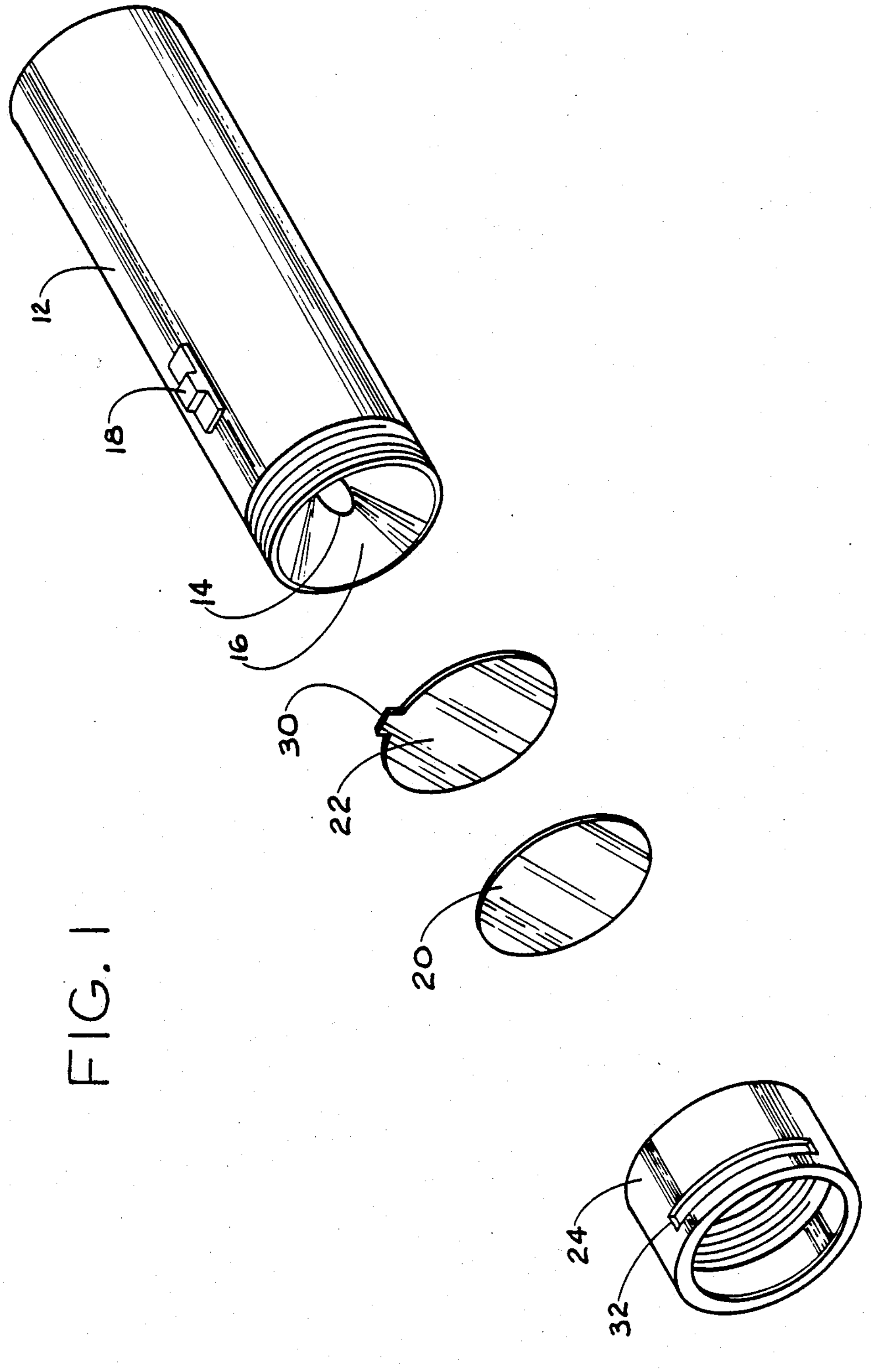
FIG. 1 is a pictorial view of a non-military type flashlight incorporating the novel improved lens system of the present invention.

As illustrated in FIG. 1 of the drawings, the flashlight comprises a conventional battery compartment 12, a lamp 14, a reflector 16 and a switch 18 which is adapted to complete an electrical circuit between the lamp 14 and a set of batteries contained in the battery compartment 12. As mentioned, these portions of the flashlight are conventional and well known in the art and, therefore, need no further description. It should be noted that the lamp 14 and reflector 16 can be arranged as illustrated in linear alignment with the battery compartment 12, or the lamp 14 and reflector 16 can be arranged so as to be directed at an angle to the linear dimension of the battery compartment, as in well known military type flashlights as will be described hereinafter.

In accordance with the present invention a pair of linear polarized lenses 20 and 22 are provided to be mounted directly in front of the lamp 14 and reflector 16 so that the beam of light produced by the lamp 14 and reflector 16 must pass through the lenses 20 and 22. A lens cap 24 is provided to house the lenses 20 and 22 and to maintain the lenses 20 and 22 in their proper position directly in front of the lamp 14 and reflector 16. The lens cap 24 is adapted to be attached to the body of the flashlight adjacent to the lamp 14 and reflector 16 by appropriate means which are well known in the art.

One of the polarized lenses 20 is mounted within the lens cap 24 in a generally fixed position such that it will not be subject to rotational movement. The other polarized lens 22 is mounted so as to lie adjacent to the first lens 20 in aligned, face-to-face arrangement with the first lens 20. In addition, polarized lens 22 is mounted so as to be rotatable about an axis which is essentially perpendicular to the broad, flat faces of the lens 22. As illustrated, a groove 28 is provided around the inner periphery of the sidewall of the cap member 24. The diameter of the inner periphery of the cap member 24 and the depth of the groove 28 are such that the disc-shaped lens 22 fits within the groove 28. The lens 22 is held in place by the groove 28 but is also free for rotational movement within the groove 28. A projecting tab or ear 30 is provided extending from the periphery of the lens 22. An elongate slot opening 32 is provided in the sidewall of the lens cap 24. The slot 32 extends peripherally around about $\frac{1}{4}$ of the periphery of the sidewall of the lens cap and coincides with the groove 28 on the inner periphery of the sidewall of the lens cap 24. The tab or ear 30 of the lens 22 is adapted to extend outwardly through the slot 32, whereby the lens 22 can be rotated by manually moving the tab or ear 30 along the length of the slot 32. It should be noted that although as shown in the preferred embodiment as being non-rotatively mounted, the first polarized lens 20 could if desired just as well be made to be rotatable also. A second groove corresponding to groove 28 and a second slot corresponding to slot 32 could be provided in the lens cap 24. A tab or ear could be provided on the first lens 20 which would correspond to the tab or ear 30 of lens 22.

The slot 32 must be of sufficient arcuate length to allow the disc-shaped lens 22 to be rotated through an angle of at least ninety degrees and up to 180 degrees. Thus, if lens 22 is the only rotatively mounted lens, then the slot 32 must extend at least around $\frac{1}{4}$ and up to $\frac{1}{2}$ of the periphery of the lens cap 24. If both lenses 20 and 22 are mounted for rotation in the lens cap 24, the two corresponding slots in the periphery of the cap 24 could be shortened so as to extend at least $\frac{1}{8}$ to $\frac{1}{4}$ of the periphery of the lens cap 24. The dual movement of the lenses 20 and 22 would result in a total movement of one with the other of the necessary 90 to 180 degrees as mentioned previously. If the relative movement of the lenses 20 and 21 is restricted to 90 degrees, it is important that the lenses be oriented such that their polarizing axes are parallel when the lenses are at one extreme of their relative movement and substantially normal when the lenses are at the other extreme of their relative movement.

The polarized lenses 20 and 22 comprise thin discs of linear polarized material such as the material sold under the trademark "Polaroid", a trademark of the Polaroid Co. Although not shown, an outer lens made of glass or optically clear plastic could be positioned adjacent to the outer face of lens 20. The outer lens would protect the polarized lenses from mechanical abuse as well as dust and dirt.

In operation, the polarized lenses 20 and 22 can be rotated relative to each other to any desired position to give any desired brightness of the beam of light from the maximum intensity produced by the lamp 14 and reflector 16 to a minimum intensity in which the light beam is very weak or subdued.

Figure 2:
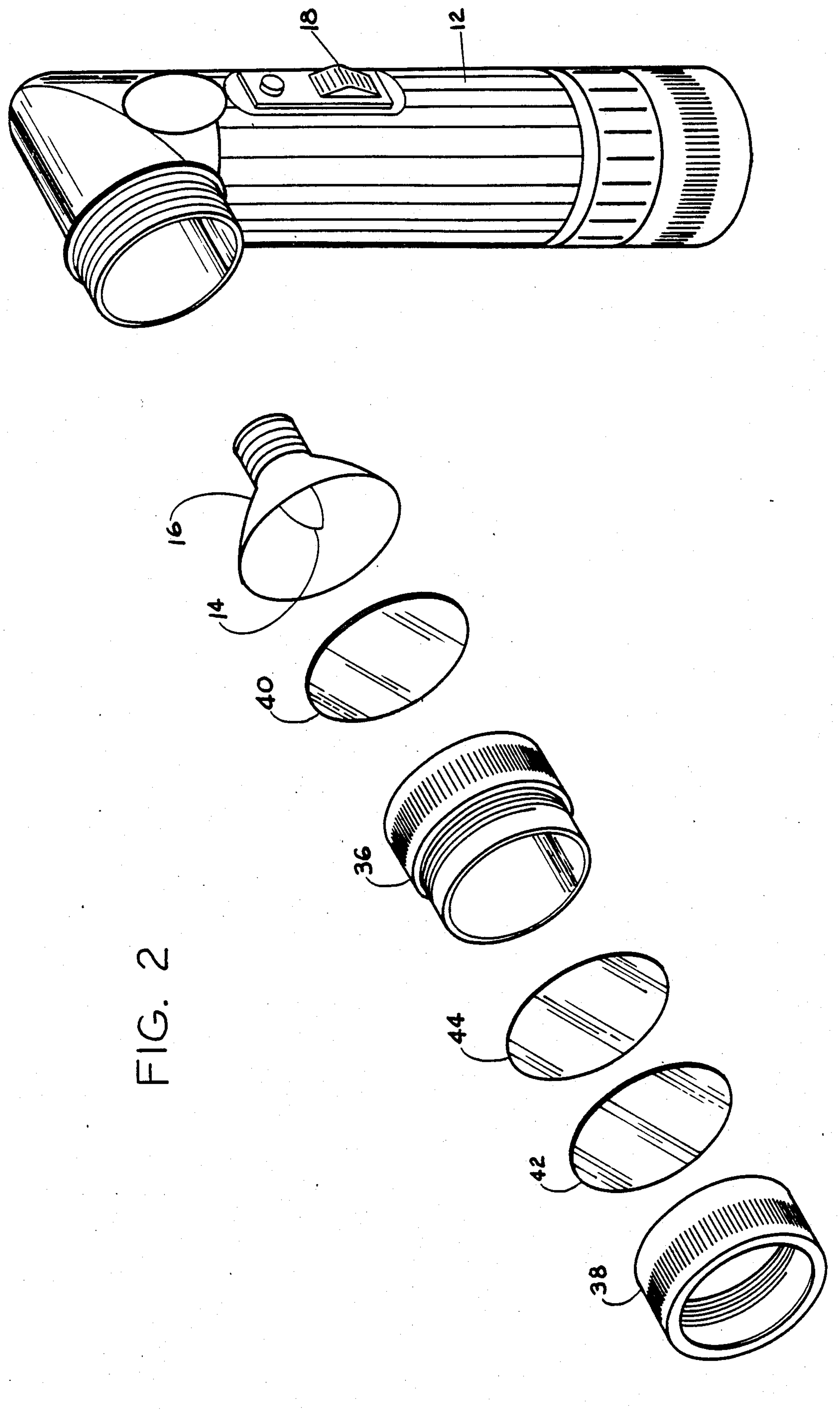
FIG. 2 is a pictorial view of a military type flashlight incorporating the novel improved lens system of the present invention.

A military type flashlight which incorporates the polarized lens system of the present invention is shown in FIG. 2 of the drawings. As with the flashlight of FIG. 1, the military type flashlight comprises a battery compartment 12, a lamp 14, a reflector 16 and a switch 18 for operating the lamp 14. The military type flashlight has a two part lens cover comprising an inner cylindrical element 36 and an outer cap 38. The inner element 36 is adapted to be screwed to the angled end receptacle of the flashlight body. The reflector 16 and lamp 14 are received in the angled end receptacle, and the inner element 36 retains the reflector 16 and lamp 14 in their proper position.

In one embodiment of a military type flashlight of the present invention, one of the polarized lenses 40 is positioned adjacent to the reflector 16 and held firmly in place by the inner cylindrical element 36 of the lens cap. The second lens 42 of the polarized lens system is then positioned between the inner element 36 and the outer cap 38. Rotational movement of the second lens 42 is achieved very simply by releasing the outer cap 38 slightly and rotating the second lens 42, with one's finger or thumb pressed on the flat face of the second lens 42. When the second lens 42 has been positioned in its desired position, the outer cap 38 is tightened to secure the second lens 42 in its desired position. Although a third lens 44 is shown in FIG. 2, the third lens 44 is not necessary at least with respect to the embodiment just described.

The third lens 44 is used in an embodiment of the military flashlight wherein a non-polarized, protective, translucent lens replaces the lens 40 of the embodiment described in the previous paragraph. In such an embodiment, in the third lens 44 is a polarized lens and it works in combination with the second lens 42. The third lens 44 will remain in a fixed position when the outer cap 38 is released slightly, and the second lens 42 can be rotated relative to the third lens 44 in a manner similar to that described in the previous paragraph.

It has been found preferable to use polarized lenses as the first and second lenses 40 and 42 and to eliminate the third lens 44 or to use a non-polarized, translucent, colored lens as the third lens 44. When only the first and second lenses 40 and 42 are utilized, it can be seen that they are separated from each other by the cylindrical element 36. The polarized lenses 40 and 42 have been found to operate very well in controlling the intensity of light when they are separated, and by being separated there is no contact between the lenses.

If one desires a particular color, there can be provided different colored polarized lenses. It is, in this respect, advantageous to utilize a third lens 44 as shown in FIG. 2 for the colored lens. In such a scheme, the two polarized lenses 40 and 42 are not colored and can be used with any desired, colored, non-polarized lens 44.

Figure 3:
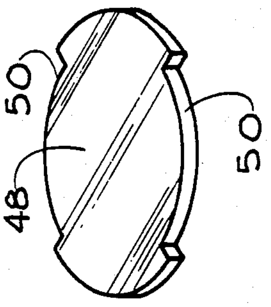
FIG. 3 is a pictorial view of a particular lens element in accordance with the present invention.
Figure 4:
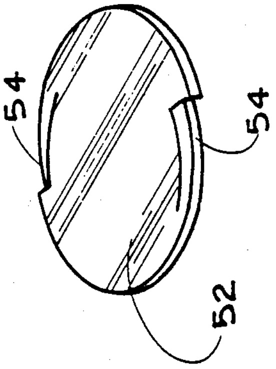
FIG. 4 is a pictorial view of a complementary lens element which is used in combination with the lens element of FIG. 3.

Preferred embodiments of polarized lenses which can be used in military and non-military type flashlights are shown in FIGS. 3 and 4. One of the lenses is, in accordance with the invention, designed to be secured in a non-rotatable position in the lens cap of the flashlight. As shown in FIG. 3, the non-rotatable lens 48 has a pair of circumferential elongate indentations or slots 50. The indentations 50 are located opposite each other on the periphery of the lens 48. The indentations 50 extend in an arc of at least 90 degrees but, of course, less than 180 degrees. The arc is preferably about 90 to 95 degrees. The peripheral size of the first lens 48 is of such a size that it fits snugly within the lens cap of the flashlight and is non-rotatable with respect to the lens cap.

The second lens 52 is designed to be rotatable. The lens 52 is shown in FIG. 4. It has a peripheral size which is slightly smaller than the peripheral size of lens 48. The lens 52 is adapted to be received within the lens cap of a flashlight such that the lens 52 is free to rotate within the cap when the cap is not tightened against the body of the flashlight. A pair of oppositely positioned ears 54 are provided adjacent to the periphery of the second lens 52. As shown, the ears 54 advantageously formed by cutting an arcuate section in the periphery of the lens 52 and displacing the arcuate section from the plane of the lens 52. Preferably, the ears 54 extend respectively from opposite faces of the lens 52, and as mentioned previously, the ears 54 are diametrically opposite each other on the lens 52.

With the ears 54 being positioned diametrically opposed with each other and extending from opposite faces of the lens 52, the second lens 52 can be positioned with either of its faces adjacent to the first lens 48. One of the ears 54 will engage the elongate indentations 50 in the periphery of the first lens 48. The second lens 52 can then be rotated about 90 degrees with respect to the first lens 48. The engagement of the ear 54 and the indentation 50 assure that at one extreme of the rotational travel of the second lens 52, the polarized lenses 48 and 52 will be aligned so as to permit maximum light transmission therethrough, and at the other extreme of the rotational travel of the second lens 52, the polarized lenses 48 and 52 will be aligned so as to essentially block transmission of light therethrough.

The lenses 48 and 52 of FIGS. 3 and 4 are conveniently used with any flashlight having a lens cap similar to the cap 38 of the military type flashlight illustrated in FIG. 2. The lenses 48 and 52 would replace lenses 42 and 44 as shown in FIG. 2, respectively. In use, the lens cap would be released slightly such that the second lens 52 can be rotated with one's finger or thumb to its desired position. The lens cap would then be tightened to secure the second lens 52 in the desired position.

Figure 5:
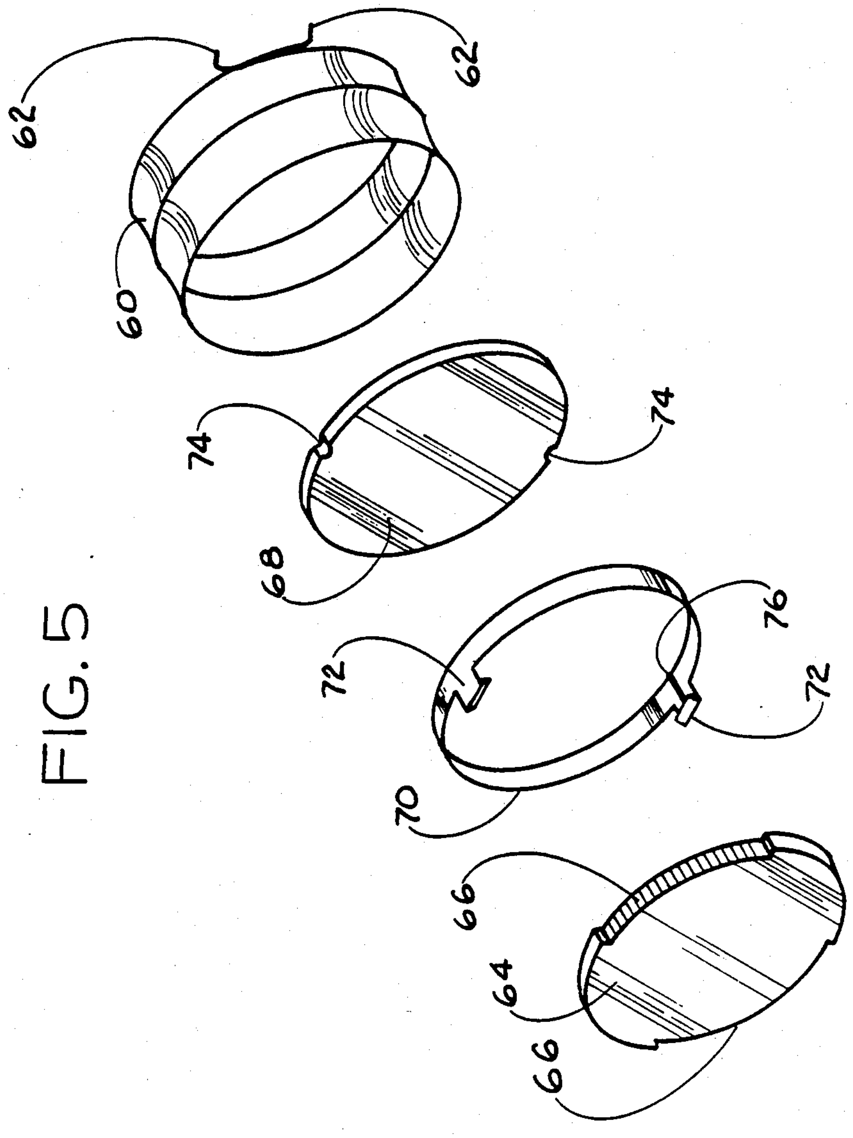
FIG. 5 is pictorial view of a universal lens cap and lens system in accordance with the present invention which can be retrofit to almost any existing flashlight.

A universal type lens cap cover and polarized lens system in accordance with the invention is shown in FIG. 5 wherein the system can be retrofit to almost any existing flashlight. The lens cap cover 60 comprises a cylindrical element made of a pliable material such as rubber or urethane. The cylindrical element is adapted to fit over the lens cap of an existing flashlight. The cover 60 can be retained by either frictional engagement of the rubber or urethane side walls to the lens cap of the flashlight or a spring type slip ring 62 can be provided to provide engagement between the cover 60 and the lens cap of the flashlight.

A second novel embodiment of polarized lenses is shown in combination with the lens cap 60 of FIG. 5. It is to be understood, of course, that the novel lenses of FIG. 5 could be used in any other of the numerous possible embodiments of the present invention.

As shown in FIG. 5, the outer or first lens 64 has a pair of elongate peripheral indentations or slots 66 which are similar to the indentations 52 of the lens shown in FIG. 3. A series of notches are provided on the inner sides of the indentations 66. The indentations are located diametrically oppose to each other on the periphery of the lens 64. The arcuate length of each indentation 66 covers about 90 degrees, preferably from about 90 to 95 degrees. The outer peripheral dimension of the lens 64 is such as to be tightly received in the cap 60 or other lens cap of a flashlight so that the lens 64 is non-rotatably retained in the cap.

As illustrated the second lens 68 is received in a retainer ring 70. The retainer ring 70 has a pair of ears 72 located diametrically opposed to each other on the ring 70 and extending in the same direction substantially normal to the plane of the ring 70. The second lens 68 is sized so as to be snugly received in the ring 70. For proper alignment, a pair of notches 74 is provided in the periphery of the lens 68. The notches 74 are diametrically opposed to each other. The notches 74 are adapted to engage a pair of protrusions 76 on the inside of the ring 70.

The ring 70 and second lens 68 are positioned adjacent to the inside face of the first lens 64. The ring 70 and second lens 68 are held in place by the cap and the first lens 64. Advantageously, the ears 72 of the ring 70 have inwardly projecting elements that are adapted to snap over the outer edge face of the first lens 64 and thus hold the first lens 64 and second lens 68 in spaced face to face arrangement. The ears 72 are received in the elongate indentations or slots 66 of lens 64, with the ears 72 being adapted to move back and forth along the length of the indentations 66. The protrusions 76 on the inside of the ring 70 extend upwardly along the inside of the ears 72. The upper portions of the protrusions 76 are adapted to engage the notches 74 in the indentations 66. Thus, the ring 70 can be moved, but it is releasably retained in its last position by the engagement between the notches 74 and the protrusions 76. Although it is advantageous to provide a ring 70 for the second lens 68, it is recognized that the ring 70 could be eliminated and the features thereof, i.e., the ears 72, could be formed directly into the periphery of the lens 68. In other words, the lens 68 could be molded so as to have ears extending from the periphery of the lens 68 and adapted to function in the same manner as the ears 72 of ring 70.

While exemplary embodiments of the invention have been illustrated and described, it is to be understood that additional changes and modifications can be made without departing from the subject matter coming within the scope of the following claims, which subject matter is regarded as the invention.

What is claimed is:

1. A pair of polarized lenses to be used in a device for emitting an incident beam of light comprising a first generally disc-shaped lens made of a linear polarized material, said first lens having a pair of elongate indentations or slots formed in the periphery thereof, said indentations or slots being positioned diametrically opposite from each other; and a second generally disc-shaped lens made of a linear polarized material, said second lens having a pair of projections extending from the periphery of the second lens so as to extend from the plane of the second lens, said projections being adapted to be received at least one at a time in a mutually respective indentation or slot in said first lens when the first and second lenses are positioned in closely spaced, face-to-face arrangement.

2. A pair of polarized lenses in accordance with claim 1, wherein the pair of projections are formed by cutting an arcuate section in the periphery of the second lens and displacing the arcuate section from the plane of the second lens.

3. A pair of polarized lenses in accordance with claim 1, wherein the pair of projections extend from respective opposite faces of said second lens, such that no matter which face of said second lens is adjacent a corresponding face of said first lens, one of the projections on said second face will be received in a mutually respective indentation or slot in said first lens.

* * * * *